(12) United States Patent
Egbert

(10) Patent No.: X8417
(45) Date of Patent: Sep. 22, 1834

(54) PUMP, FORCING

(76) Inventor: James D. Egbert

James D. Egbert Lansing New York
Letters Patent.

The Schedule referred to in these Letters Patent and making part of the same containing a description in the words of the said James D. Egbert himself of his improvement in the Forcing Pump.

To all to whom these presents shall come.

Be it known that I, James D. Egbert of Lansing in the County of Tompkins and State of New York, have invented a new and useful improvement in the Forcing Pump. and that the following is a full and exact description of the construction and operation of the said Machine as invented or improved by me.

Two cylinders are to be connected together at their lower ends, as they would stand side by side in a perpendicular position, that is resting upon said ends. They may be about ten inches in height and two inches bore. to be made of metal (lead would perhaps be preferable) and the case upon which they rest and by which they are connected, may be about two inches and a half high, by about five inches in length forming an oblong box or reservoir. on the top of this case between the cylinders will be formed an opening in about the centre of about three quarters of an inch in diameter, so as to admit a tube of that bore, which will be called the discharging tube, and will rise to any required height, and may be bent over so as to discharge the water raised, into the vessel for its reception.

That portion of the side of each cylinder forming the end of this case is to be perforated, and to have a valve adjusted so as to open inside the reservoir, and the open or lower ends of the cylinders and reservoir are to be closed, by resting on a base base, to which they are to be closely fitted, so as to prevent the passage of air or water. This base or bed is to form a hollow case having at the bottom an opening for the recep= tion of a tube by which the water is to be led from the Spring or well forming the supply. On the top are to be two valves, one for each cylinder opening upwards, and immedialy under the end of the cylinder. A piston is adjusted to each cylinder of about sixteen inches in length, having at the lower end, a Joint, so as to allow for the lateral motion of the crank above. From this Joint descends a small rod, having at the end, a screw and nut, for the purpose of retaining a small cylindrical piece of wood, having a groove turned round the middle of its length, which may be about two inches; and a hole through its length by which it is placed on the said rod. This piece is then covered with leather which is simply wrapped round it and secured by a row of nails driven into the groove; by which means the head are kept from the sides of the cylinder, and the upper and lower edges of the leather at each stroke of the piston, alternately leave the sides of the wooden cylinder, and adhere closely to those of the metallic ones - thereby rendering the box of the piston tight. The upper end of said piston works on a crank of about one inch and three quarters stroke which is turned by a handle, and rested on the ends of two long strips of iron, descending to the sill, below the base where they are secured one on each side. They are also attached to the ends of the cap piece of the top of the cylinders, by means of a hook formed on the end of each. The reservoir and base may be secured against each other, by means of a [blank] passing around them and screwed down beneath the sill. Two, four, or more cylinders may be used.

The water is now drawn up the pipe leading from the well, by the rising stroke of one piston, by which the reservoir reservoir is filled: and the descending stroke of the opposite piston discharges it by the tube above, for that purpose.- It is particularly adapted to the use of domestic purposes, as it will supply a kitchen with any small force, at the rate of about three buckets full per minute; and from its force in discharging water, will be of great service when applied to engines, &c.

My claim is for the formation of the boxes as above described, and for the combination of the cylinders with the reservoir & base.

In testimony that the above is a full and correct description of the construction and use of my Machine, as invented or improved by me, I have hereunto set my hand this nineteenth day of September in the year eighteen hundred and thirty four.

Witnesses
Henry Stone.
Robt. Clarke.

James D. Egbert (Patented 22 Sept. 1834.)

948 wds) (Exd. [illegible]